United States Patent
Liao

(10) Patent No.: US 8,068,111 B2
(45) Date of Patent: Nov. 29, 2011

(54) METHOD FOR INCREASING SPEED IN VIRTUAL THREE DIMENSIONAL APPLICATION

(75) Inventor: Yu Cheng Liao, Jhubei (TW)

(73) Assignee: Generalplus Technology Inc., Hsinchu (TW)

( * ) Notice: Subject to any disclaimer, the term of this patent is extended or adjusted under 35 U.S.C. 154(b) by 761 days.

(21) Appl. No.: 12/139,874

(22) Filed: Jun. 16, 2008

(65) Prior Publication Data

US 2009/0122057 A1 May 14, 2009

(30) Foreign Application Priority Data

Nov. 14, 2007 (TW) ................................ 96142945 A

(51) Int. Cl.
G06T 15/00 (2006.01)
(52) U.S. Cl. ........ 345/530; 345/419; 345/586; 345/649; 345/660; 348/478
(58) Field of Classification Search ........................ None
See application file for complete search history.

(56) References Cited

U.S. PATENT DOCUMENTS

| 7,313,710 | B1 * | 12/2007 | Holmer ............... 713/320 |
| 2004/0228521 | A1 * | 11/2004 | Jeong et al. ............ 382/154 |
| 2007/0153123 | A1 * | 7/2007 | Pan et al. ............... 348/452 |

* cited by examiner

Primary Examiner — Kee M Tung
Assistant Examiner — Michelle Chin
(74) Attorney, Agent, or Firm — Muncy, Geissler, Olds & Lowe, PLLC

(57) ABSTRACT

A method for increasing speed in virtual 3D application is applied to a game console, which includes a processor and is used for outputting scan lines of a frame. The method includes the steps of: providing registers corresponding to the scan lines; and interrupting the processor in a vertical blank period. The step of interrupting includes: calculating 3D operating parameters corresponding to the scan lines according to an operation provided to the game console by a user; storing the 3D operating parameters into the registers; and calculating outputted scan lines according to the scan lines and the corresponding 3D operating parameters. Since the registers respectively corresponding to the scan lines are provided, the number of times of interrupting the processor can be decreased and the efficiency can be greatly increased.

6 Claims, 4 Drawing Sheets

METHOD FOR INCREASING SPEED IN VIRTUAL THREE DIMENSIONAL APPLICATION

BACKGROUND OF THE INVENTION

1. Field of Invention

The invention relates to image processing technology, and more particularly to a method for increasing speed in virtual 3D application.

2. Related Art

Recently, the technology is advanced. So, a conventional game console having a flat image display is gradually replaced with another game console with 3D image processing. FIG. 1 is a schematic illustration showing a concept of simple 3D image processing applied to a conventional game console. As shown in FIG. 1, a tile 11 on the floor in a lower portion of a frame 101 is larger than a tile 12 in an upper portion of the frame 101 so that the distance difference can be seen from the drawing. Correspondingly, a user (player) can imagine that he or she stands on the floor at the lower portion of the frame and looks forwards. Basically, the concept of this virtual 3D image processing is to achieve the effect of simulating the floor in the 3D space according to the two-dimensional (2D) plane by adjusting the scaling ratio of each scan line.

FIG. 2 is a schematic illustration showing calculations of the 3D image processing of FIG. 1 in the conventional game console. As shown in FIG. 2, before a first scan line S1 is outputted, an interrupt instruction is sent to a processor in the game console so that the processor starts to calculate a scaling parameter and a rotating parameter corresponding to the first scan line S1 and stores the scaling parameter and the rotating parameter into a share register 20. Next, after the first scan line S1 is outputted, a horizontal blanking period H-Blank is entered, the interrupt instruction has to be outputted again so that the scaling parameter and the rotating parameter corresponding to a second scan line S2 can be calculated and stored to the share register 20 to overwrite the scaling parameter and the rotating parameter originally stored in the share register 20. The processes are repeated until the frame is completed calculated. In brief, all the scan lines share the same scaling register and the parameters stored in the scaling register are updated after each scan line ends in this method.

However, the calculation is made according to 262 scan lines refreshed 60 times per second in a standard television. So, the number of times of interrupting the internal processor is equal to 60×262=15720. The virtual 3D technology is usually used in a portable game console, which has the processor and the power consumption that are restricted. Thus, when the process is interrupted too frequently and the interrupt delay of the system is too long, the delay of the game may occur. In addition, the processor, which is often in the busy state, causes the too-high power consumption so that the lifetime of the battery is shortened.

SUMMARY OF THE INVENTION

It is therefore an object of the invention to provide a method for increasing speed in virtual three dimensional application in order to decrease the number of interrupting instructions and decrease the power consumption.

The invention achieves the above-mentioned object or other objects by providing a method of increasing speed in virtual three dimensional (3D) application. The method is applied to a game console, which comprises a processor and outputs a plurality of scan lines of a frame. The method includes the steps of: providing a plurality of registers corresponding to the scan lines; and interrupting the processor in a vertical blank period. The step of interrupting includes the sub-steps of: calculating a plurality of 3D operating parameters corresponding to the scan lines according to an operation provided to the game console by a user; storing the 3D operating parameters into the registers; and calculating a plurality of outputted scan lines according to the scan lines and the 3D operating parameters corresponding to the scan lines.

According to the method in the preferred embodiment of the invention, the 3D operating parameters include scaling parameters and rotating parameters. In addition, the number of registers may be one half of the total number of the scan lines in one embodiment so that the odd-numbered scan line and the even-numbered scan line share one register.

The spirit of the invention is to provide many registers for storing many 3D operating parameters and to interrupt the processor one time in the vertical blank period, during which the processor calculates the 3D operating parameters of the scan lines and respectively stores the 3D operating parameters to the corresponding registers. Thus, the number of times of interrupting the processor can be decreased, the loading of the processor can be decreased, and the efficiency can thus be enhanced. Correspondingly, the power consumption can be decreased.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
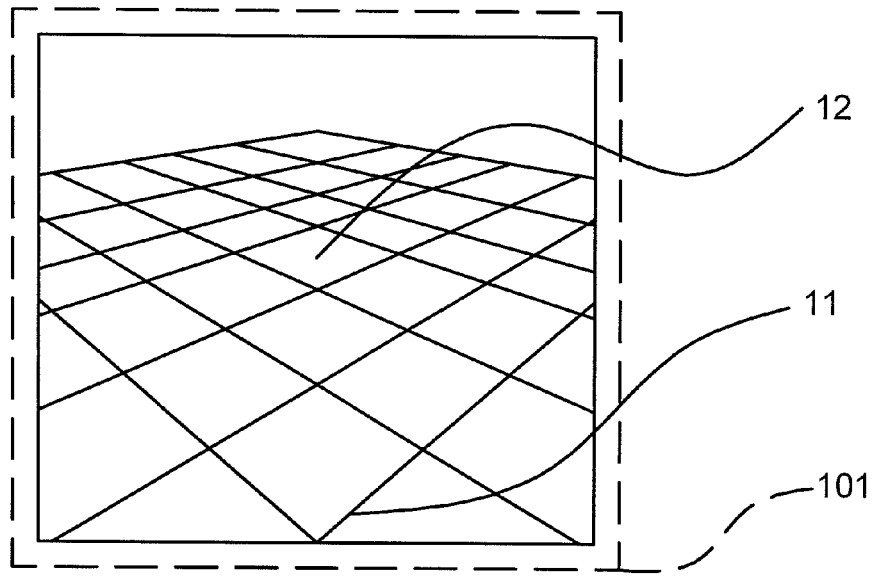
FIG. 1 is a schematic illustration showing a concept of simple 3D image processing applied to a conventional game console.
Figure 2:
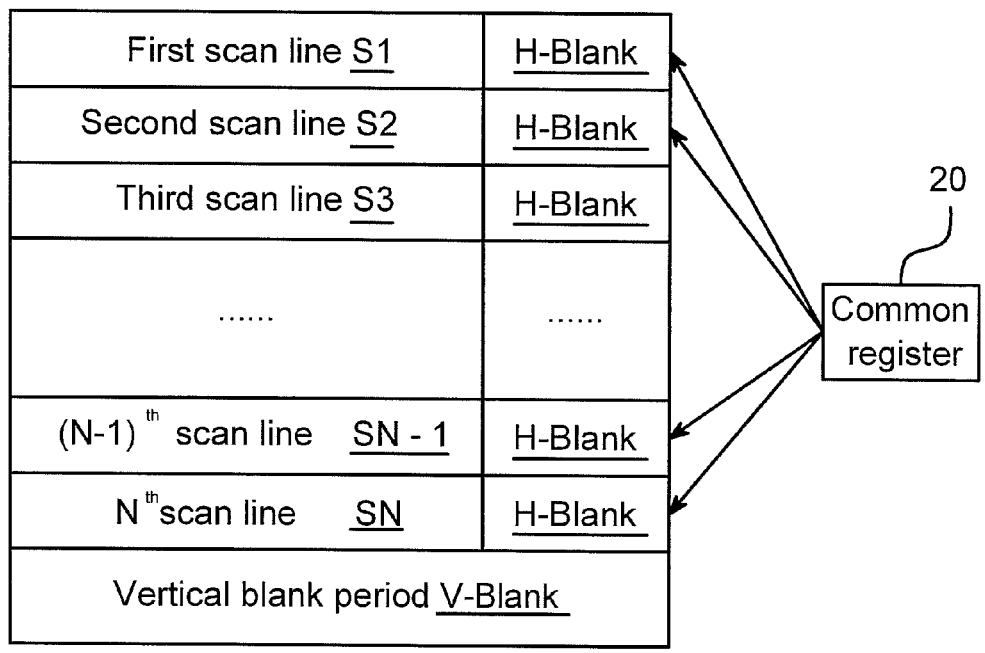
FIG. 2 is a schematic illustration showing calculations of the 3D image processing of FIG. 1 in the conventional game console.
Figure 3:
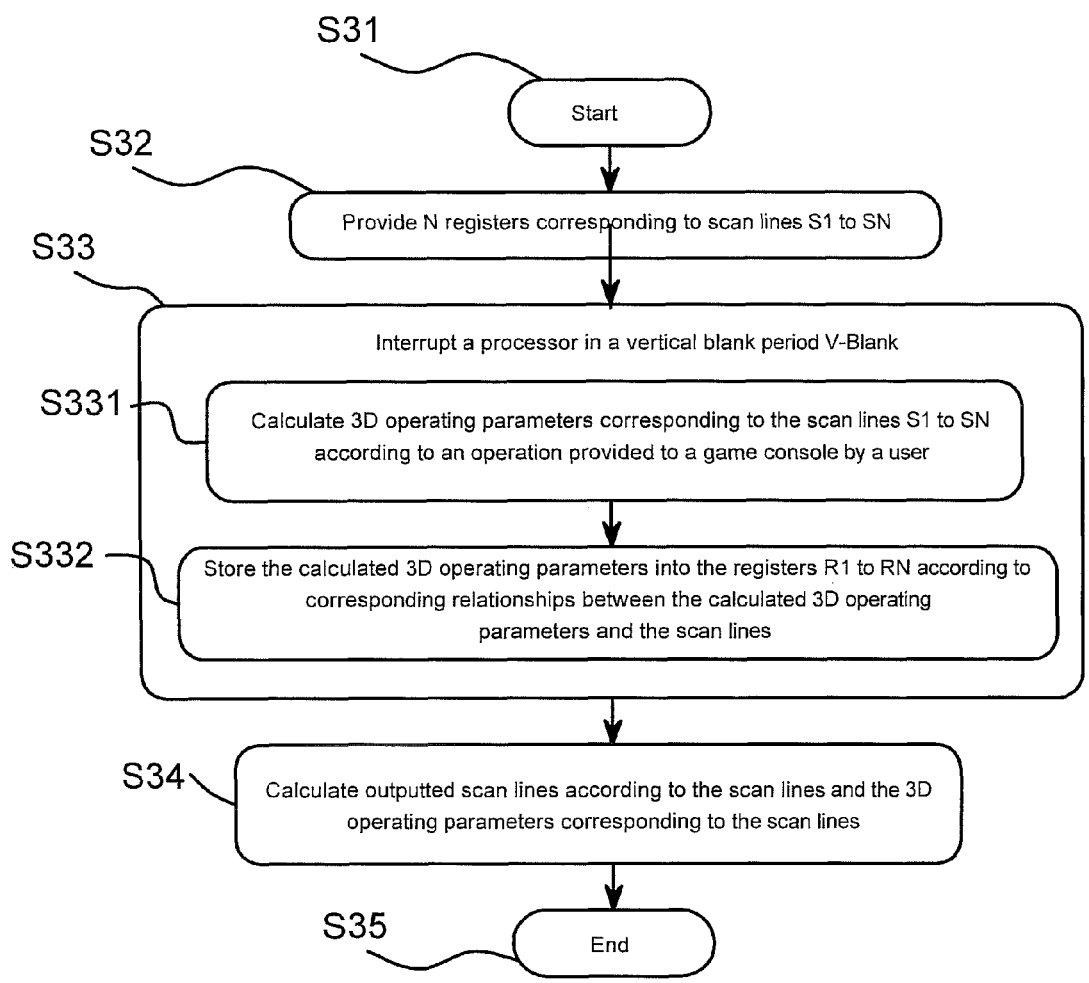
FIG. 3 is a flow chart showing a method for increasing speed in virtual 3D application according to a preferred embodiment of the invention.
Figure 4:
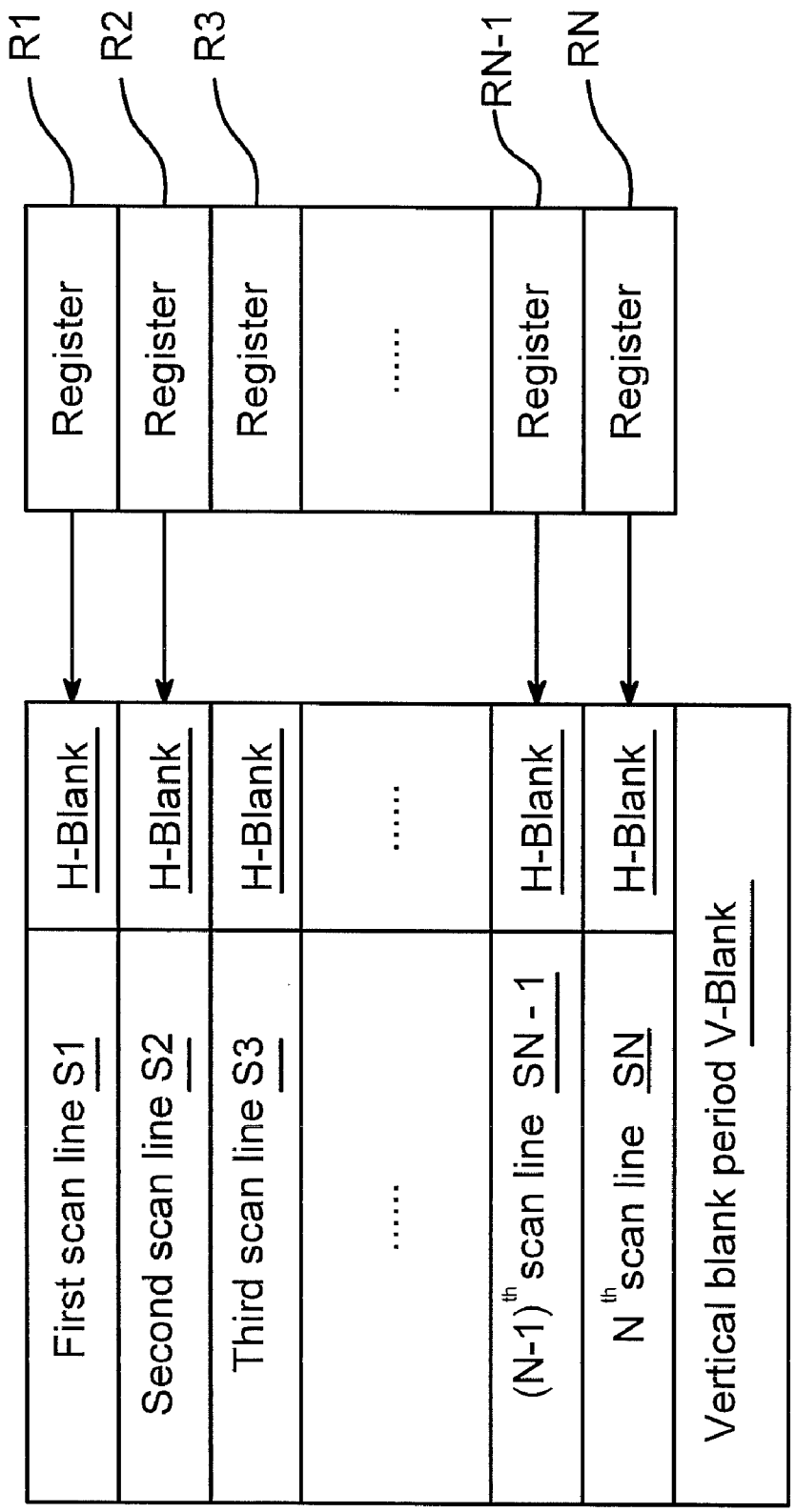
FIG. 4 is a schematic illustration showing the method of FIG. 3 according to the preferred embodiment of the invention.

FIG. 3 is a flow chart showing a method for increasing speed in virtual 3D application according to a preferred embodiment of the invention. FIG. 4 is a schematic illustration showing the method of FIG. 3 according to the preferred embodiment of the invention. As shown in FIGS. 3 and 4, it is assumed that the embodiment of the invention is applied to a game console, which includes a processor. The method includes the following steps.

In step S31, the method starts.

In step S32, N registers corresponding to scan lines S1 to SN are provided.

In step S33, the processor is interrupted in a vertical blank period V-Blank. The step S33 includes the following steps.

In step S331, multiple 3D operating parameters corresponding to the scan lines S1 to SN are calculated according to an operation provided to the game console by a user. Typically, the 3D operating parameters may be rotating parameters or scaling parameters, or may include both the rotating parameters and the scaling parameters.

In step S332, the calculated 3D operating parameters are respectively stored into the registers R1 to RN according to corresponding relationships between the calculated 3D operating parameters and the scan lines.

In step S34, outputted scan lines are calculated according to the scan lines and the 3D operating parameters corresponding thereto. That is, the scan lines are outputted to a display according to the corresponding rotating and scaling parameters.

In step S35, the method ends.

As can be seen from this embodiment, the registers R1 to RN corresponding to the scan lines S1 to SN are provided and the calculated 3D operating parameters are stored into the registers R1 to RN in the vertical blank period at a time. If the calculation is made according to 262 scan lines refreshed 60 times per second in a standard television, the number of times of interrupting the internal processor per second is only equal to 60. Compared with the prior art, although the number of registers is increased, the loading of the processor is greatly decreased.

Figure 5:
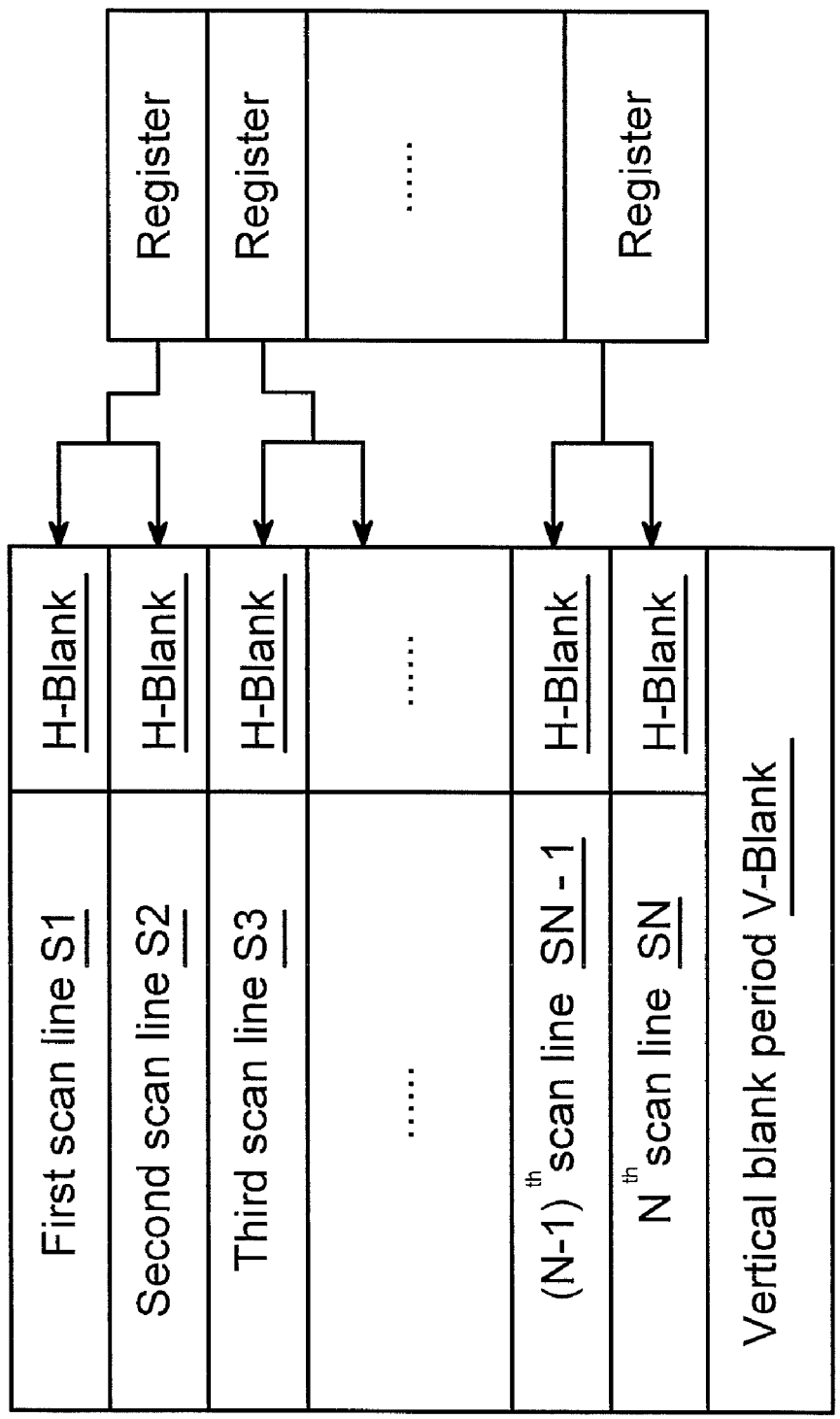
FIG. 5 is a schematic illustration showing another aspect of the method of FIG. 3 according to the preferred embodiment of the invention.

In this embodiment, each scan line corresponds to the register for storing the 3D operating parameter, and these registers need a larger space on an integrated circuit. FIG. 5 is a schematic illustration showing another aspect of the method of FIG. 3 according to the preferred embodiment of the invention. As shown in FIG. 5, two scan lines share one register in this embodiment. That is, the odd-numbered scan line and the even-numbered scan line commonly use the same 3D operating parameter so that the quality of the output frame, the efficiency and the cost can be optimized. Because there are many systems adopting the interlaced scan, the display effect is not significantly different from that of FIG. 4 according to the method of sharing the register.

In summary, the spirit of the invention is to provide many registers for storing many 3D operating parameters and to interrupt the processor one time in the vertical blank period, during which the processor calculates the 3D operating parameters of the scan lines and respectively stores the 3D operating parameters to the corresponding registers. Thus, the number of times of interrupting the processor can be decreased, the loading of the processor can be decreased, and the efficiency can thus be enhanced. Correspondingly, the power consumption can be decreased. In addition, as can be seen from this embodiment, if the calculation is made according to 262 scan lines refreshed 60 times per second in a standard television, the number of times of interrupting the internal processor per second is 1/262 times that of the prior art.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method of increasing speed in virtual three dimensional (3D) application being applied to a game console, which comprises a processor and outputs N scan lines of a frame, the method comprising the steps of:
   providing N registers corresponding to the N scan lines; and
   interrupting the processor in a vertical blank period, wherein the step of interrupting comprises the sub-steps of:
   calculating N 3D operating parameters according to an operation provided to the game console by a user, wherein the $i^{th}$ 3D parameter corresponds to the $i^{th}$ scan lines;
   storing the 3D operating parameters into the registers, wherein the $i^{th}$ 3D operating parameter is stored in the $i^{th}$ register; and
   calculating a plurality of output scan lines, wherein $k^{th}$ outputted scan lines is calculated according to the $k^{th}$ scan lines and the $k^{th}$ 3D operating parameter,
   wherein "N", "i" and "k" are nature number and $0<=i<=N$, $0<=k<=N$
   wherein the virtual 3D is a virtualization which uses the virtual 3D parameters to change the 2D display frame for obtaining a frame with 3D effect.

2. The method according to claim 1, wherein the virtual 3D operating parameters comprise rotating parameters of the scan lines.

3. The method according to claim 1, wherein the virtual 3D operating parameters comprise scaling parameters of the scan lines.

4. A method of increasing speed in virtual three dimensional (3D) application being applied to a game console, which comprises a processor and outputs 2N scan lines of a frame, the method comprising the steps of:
   providing N registers corresponding to the 2N scan lines, wherein the $2k^{th}$ and $(2k+1)^{th}$ scan lines correspond to the $k^{th}$ register; and
   interrupting the processor in a vertical blank period, wherein the step of interrupting comprises the sub-steps of:
   calculating N 3D operating parameters according to an operation provided to the game console by a user, wherein the $i^{th}$ 3D parameter corresponds to the $2i^{th}$ and the $(2i+1)^{th}$ scan lines;
   storing the 3D operating parameters into the registers, wherein the $i^{th}$ 3D operating parameter is stored in the $i^{th}$ register; and
   calculating a plurality of output scan lines, wherein the $2j^{th}$ outputted scan line is calculated according to the $2j^{th}$ scan lines and the $j^{th}$ 3D operating parameter and the $(2j+1)^{th}$ outputted scan line is calculated according to the $(2j+1)^{th}$ scan lines and the $j^{th}$ 3D operating parameter,
   wherein "N", "i", "j" and "k" are Nature number, and $0<=i<=N$, $0<=j$, $k,<=2N$,
   wherein the virtual 3D is a virtualization which uses the virtual 3D parameters to change the 2D display frame for obtaining a frame with 3D effect.

5. The method according to claim 4, wherein the virtual 3D operating parameters comprise rotating parameters of the scan lines.

6. The method according to claim 4, wherein the virtual 3D operating parameters comprise scaling parameters of the scan lines.

\* \* \* \* \*